United States Patent
Iwamoto et al.

(10) Patent No.: US 10,353,185 B2
(45) Date of Patent: Jul. 16, 2019

(54) CONVERSION LENS, AND IMAGING OPTICAL SYSTEM AND OPTICAL APPARATUS INCLUDING CONVERSION LENS

(71) Applicant: CANON KABUSHIKI KAISHA, Tokyo (JP)

(72) Inventors: Shunji Iwamoto, Utsunomiya (JP); Shinichiro Saito, Utsunomiya (JP); Satoshi Maetaki, Utsunomiya (JP); Takahiro Hatada, Utsunomiya (JP); Suguru Inoue, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 99 days.

(21) Appl. No.: 15/707,102

(22) Filed: Sep. 18, 2017

(65) Prior Publication Data

US 2018/0095255 A1 Apr. 5, 2018

(30) Foreign Application Priority Data

Sep. 30, 2016 (JP) .................................. 2016-193122

(51) Int. Cl.
*G02B 15/163* (2006.01)
*G02B 9/62* (2006.01)
*C03C 3/097* (2006.01)
*G02B 27/00* (2006.01)

(52) U.S. Cl.
CPC ............ *G02B 15/163* (2013.01); *C03C 3/097* (2013.01); *G02B 9/62* (2013.01); *G02B 27/0025* (2013.01)

(58) Field of Classification Search
CPC .... G02B 15/163; G02B 27/0025; G02B 9/62; G02B 15/177; G02B 15/20; G02B 15/02; G02B 15/04; G02B 13/009; G02B 15/00; G02B 15/08; G02B 15/10; G02B 15/12; C03C 3/097

USPC .................................................. 359/672–675
See application file for complete search history.

(56) References Cited

U.S. PATENT DOCUMENTS

| 4,643,536 A * | 2/1987 | Yamada ................. G02B 15/02 359/675 |
| 5,952,256 A | 9/1999 | Morishita et al. |
| 6,906,866 B2 | 6/2005 | Hudyma |
| 2009/0080087 A1* | 3/2009 | Yamada ................. G02B 15/12 359/672 |
| 2012/0250168 A1* | 10/2012 | Eguchi ................. G02B 15/177 359/753 |
| 2016/0054549 A1 | 2/2016 | Takemoto |
| 2016/0077309 A1 | 3/2016 | Ohashi et al. |

(Continued)

FOREIGN PATENT DOCUMENTS

| JP | 6-135738 A | 5/1994 |
| JP | 10-265238 A | 10/1998 |
| JP | 2015-215557 A | 12/2015 |

*Primary Examiner* — Stephone B Allen
*Assistant Examiner* — Rahman Abdur
(74) *Attorney, Agent, or Firm* — Canon USA Inc., IP Division

(57) ABSTRACT

A conversion lens having a negative refractive power includes a positive lens GP. The positive lens GP satisfies all the following conditional expressions:

$$30 \leq \nu d \leq 40,$$

$$1.225 \leq [nd-(14.387/\nu d)] \leq 1.276, \text{ and}$$

$$0.4300 \leq [\theta gF-(2.9795/\nu d)] \leq 0.5010,$$

where $\nu d$ is an Abbe number of the positive lens GP, $\theta gF$ is a partial dispersion ratio of the positive lens GP for g-line and F-line, and nd is a refractive index of the positive lens GP for d-line.

11 Claims, 13 Drawing Sheets

(56) References Cited

U.S. PATENT DOCUMENTS

2016/0274336 A1 9/2016 Kawamura
2016/0274443 A1* 9/2016 Ogata .................... G03B 17/14

* cited by examiner

CONVERSION LENS, AND IMAGING OPTICAL SYSTEM AND OPTICAL APPARATUS INCLUDING CONVERSION LENS

BACKGROUND OF THE INVENTION

Field of the Invention

The present invention relates to a conversion lens favorable for an optical apparatus such as a digital video camera, a digital still camera, a broadcasting camera, a silver-halide film camera, or a monitoring camera.

Description of Related Art

A focal length of an entire lens system can be increased by inserting a conversion lens having a negative refractive power to a position between a master lens (interchangeable lens) and a main unit of an imaging apparatus. The aberration of the conversion lens itself has to be favorably corrected in order to reduce deterioration in image quality arising when the conversion lens is inserted.

In order to correct chromatic aberration of magnification (also known as lateral or transverse chromatic aberration) of the conversion lens itself, it is important to select an appropriate optical material. A positive lens formed of a highly-dispersive optical material having a low partial dispersion ratio may be used for correcting the chromatic aberration of magnification in a wide range of wavelengths.

Japanese Patent Application Laid-Open No. 10-265238 discusses a highly-dispersive optical glass that exhibits negative anomalous partial dispersibility.

SUMMARY OF THE INVENTION

The present invention is directed to a conversion lens in which chromatic aberration of magnification and field curvature are corrected.

According to an aspect of the present invention, a conversion lens having a negative refractive power in its entirety includes a positive lens, wherein the following conditional expressions are satisfied, $$30 \leq vd \leq 40,$$

$$1.225 \leq [nd - (14.387/vd)] \leq 1.276, \text{ and}$$

$$0.4300 \leq [\theta gF - (2.9795/vd)] \leq 0.5010,$$

where $vd$ is an Abbe number of the positive lens, $\theta gF$ is a partial dispersion ratio of the positive lens for g-line and F-line, and $nd$ is a refractive index of the positive lens for d-line.

Further features of the present invention will become apparent from the following description of exemplary embodiments with reference to the attached drawings.

DESCRIPTION OF THE EMBODIMENTS

Hereinafter, an exemplary embodiment embodying a conversion lens and an optical apparatus including the conversion lens of the present invention will be described. The conversion lens in each of the exemplary embodiments is used by being attached to an imaging lens used for an imaging apparatus such as a digital still camera, a digital video camera, a broadcasting camera, or a silver-halide film camera.

Figure 1:
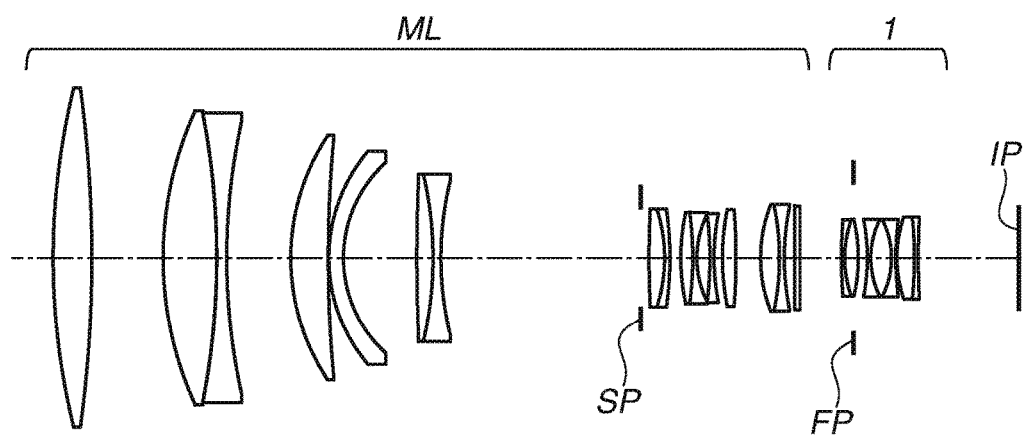
FIG. 1 is a cross-sectional diagram illustrating a state where a conversion lens of a first exemplary embodiment is attached to a master lens.
Figure 2:
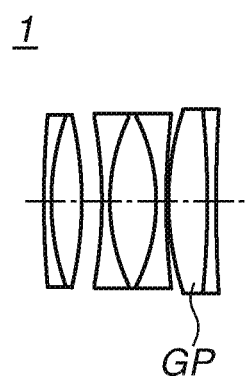
FIG. 2 is a cross-sectional diagram illustrating the conversion lens of the first exemplary embodiment.
Figure 3:
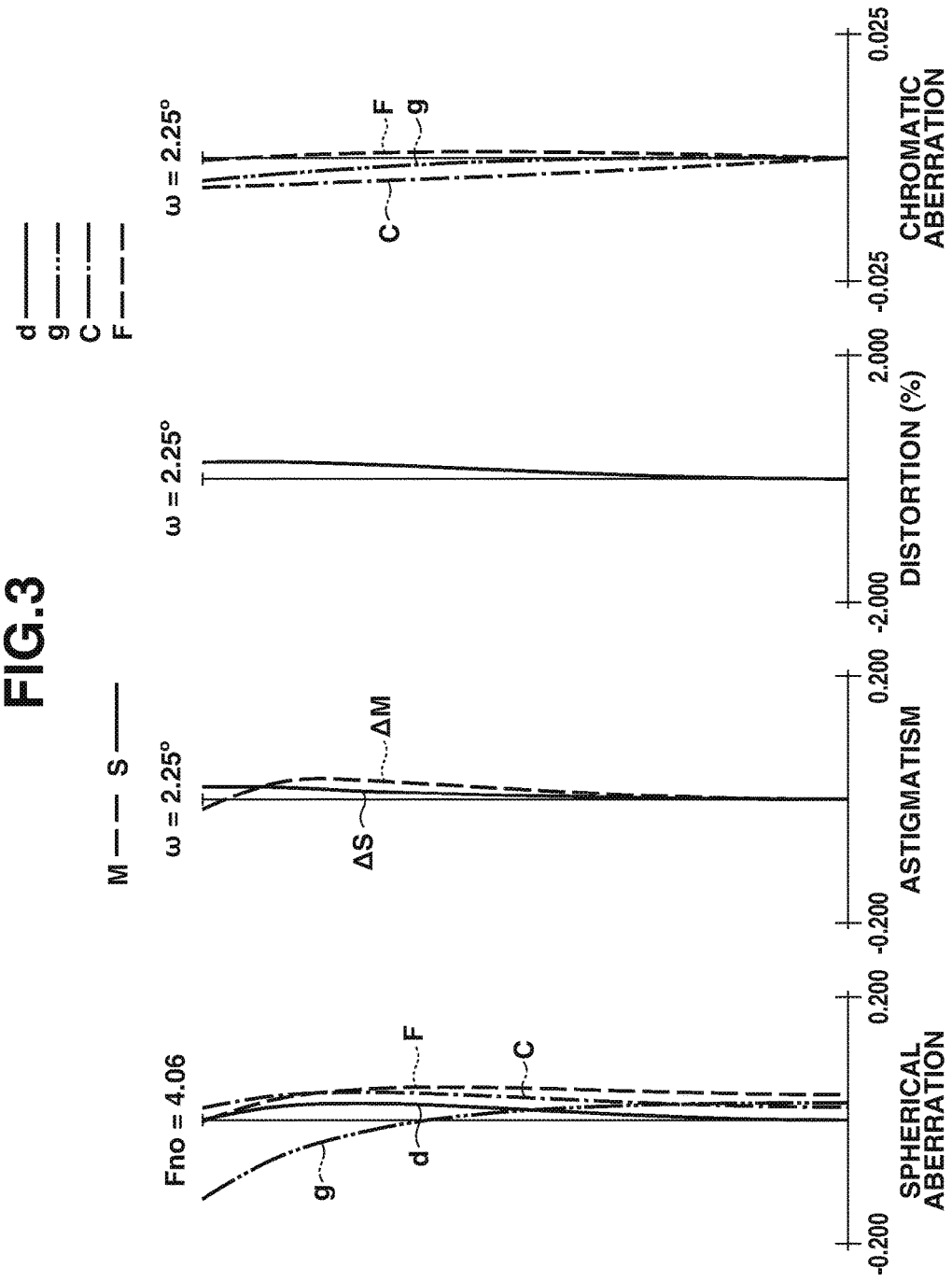
FIG. 3 is a diagram illustrating aberrations when the conversion lens of the first exemplary embodiment is attached to a master lens.
Figure 4:
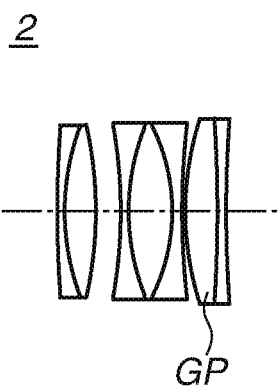
FIG. 4 is a cross-sectional diagram illustrating a conversion lens of a second exemplary embodiment.
Figure 5:
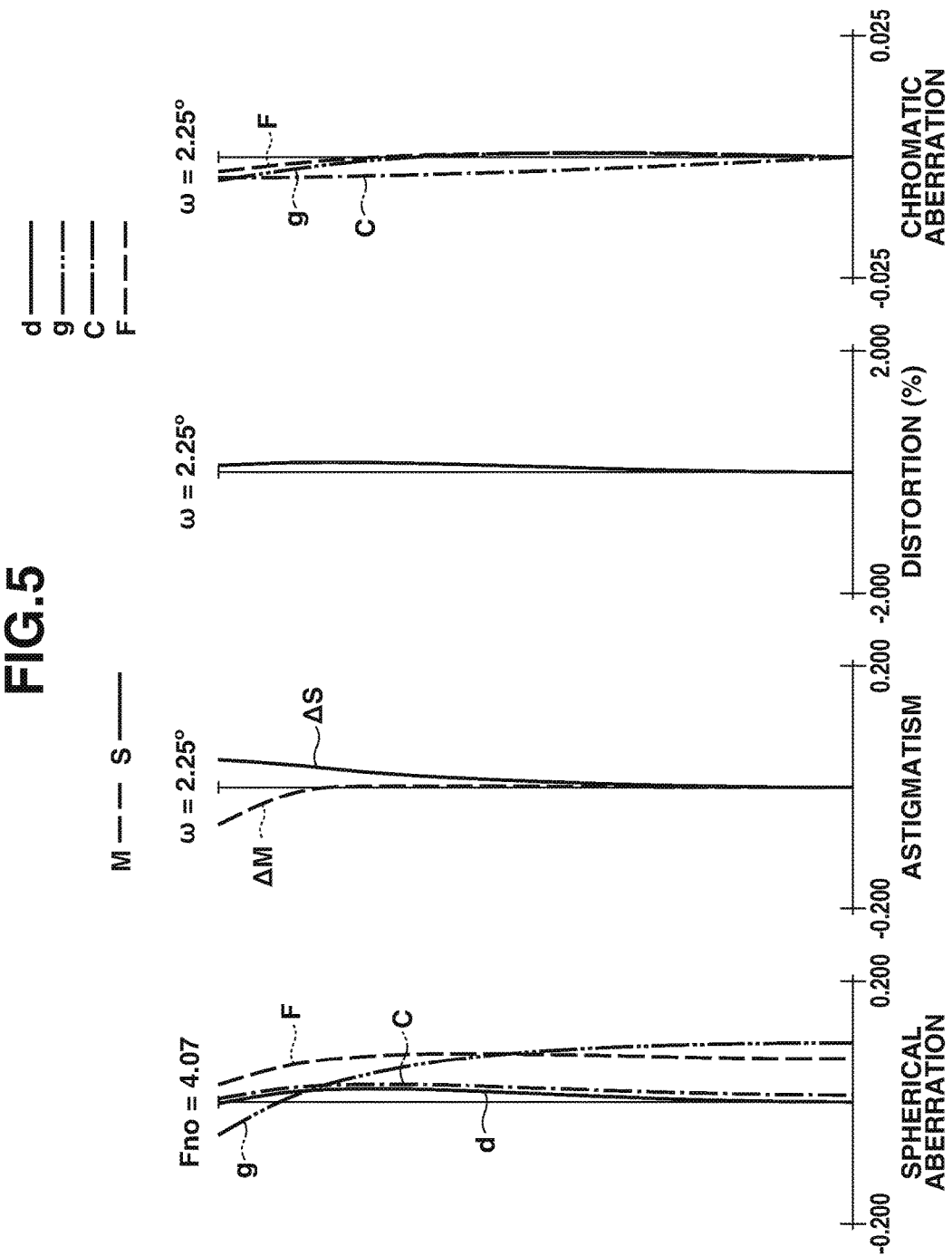
FIG. 5 is a diagram illustrating aberrations when the conversion lens of the second exemplary embodiment is attached to a master lens.
Figure 6:
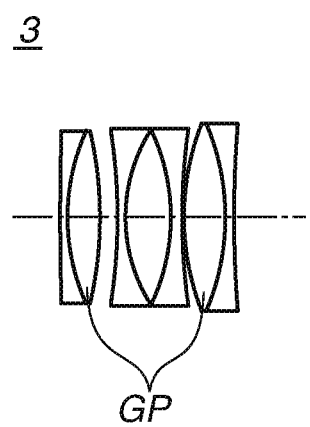
FIG. 6 is a cross-sectional diagram illustrating a conversion lens of a third exemplary embodiment.
Figure 7:
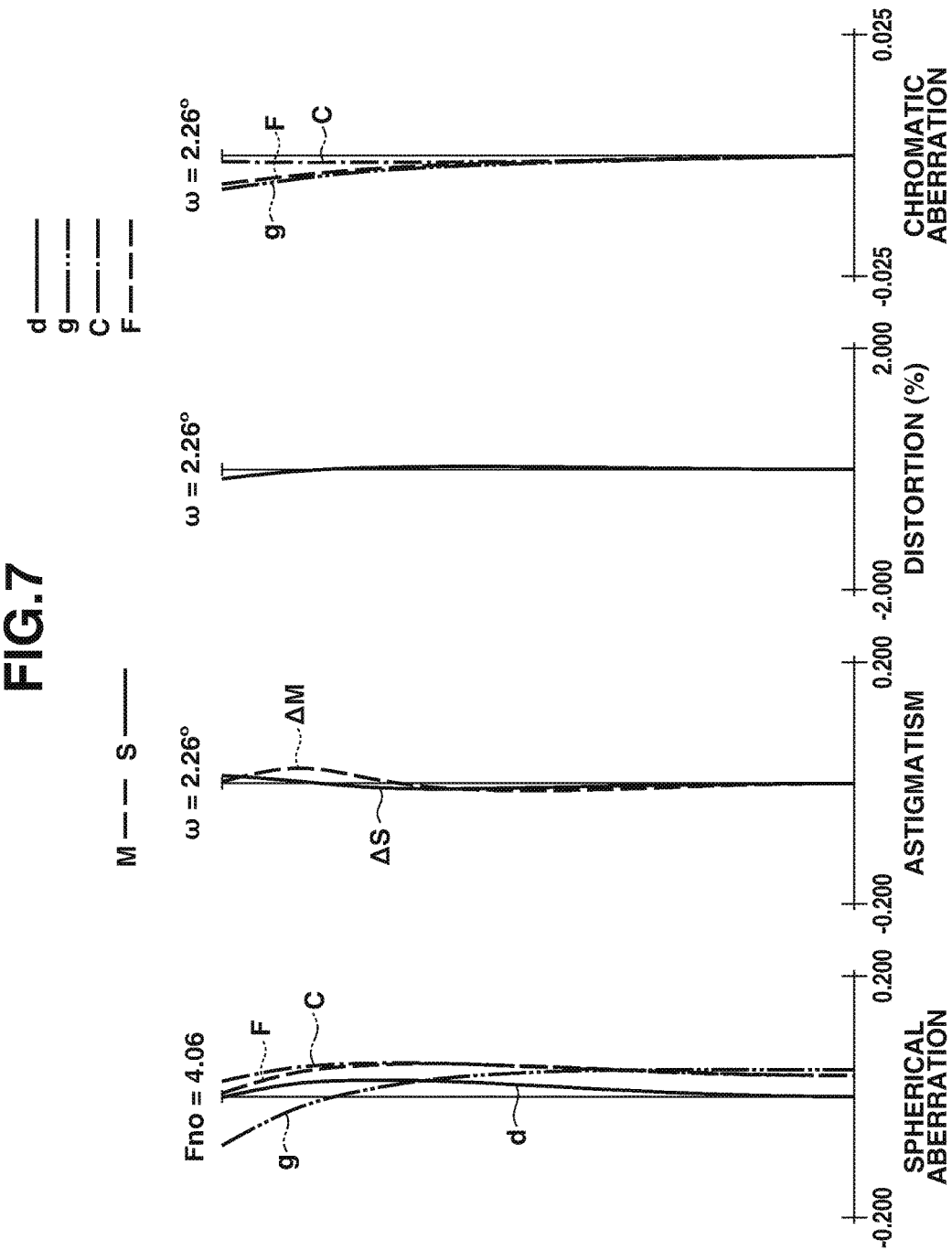
FIG. 7 is a diagram illustrating aberrations when the conversion lens of the third exemplary embodiment is attached to a master lens.
Figure 8:
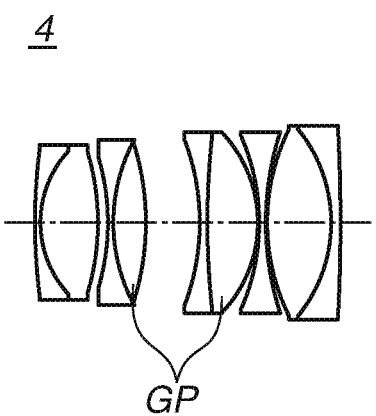
FIG. 8 is a cross-sectional diagram illustrating a conversion lens of a fourth exemplary embodiment.
Figure 9:
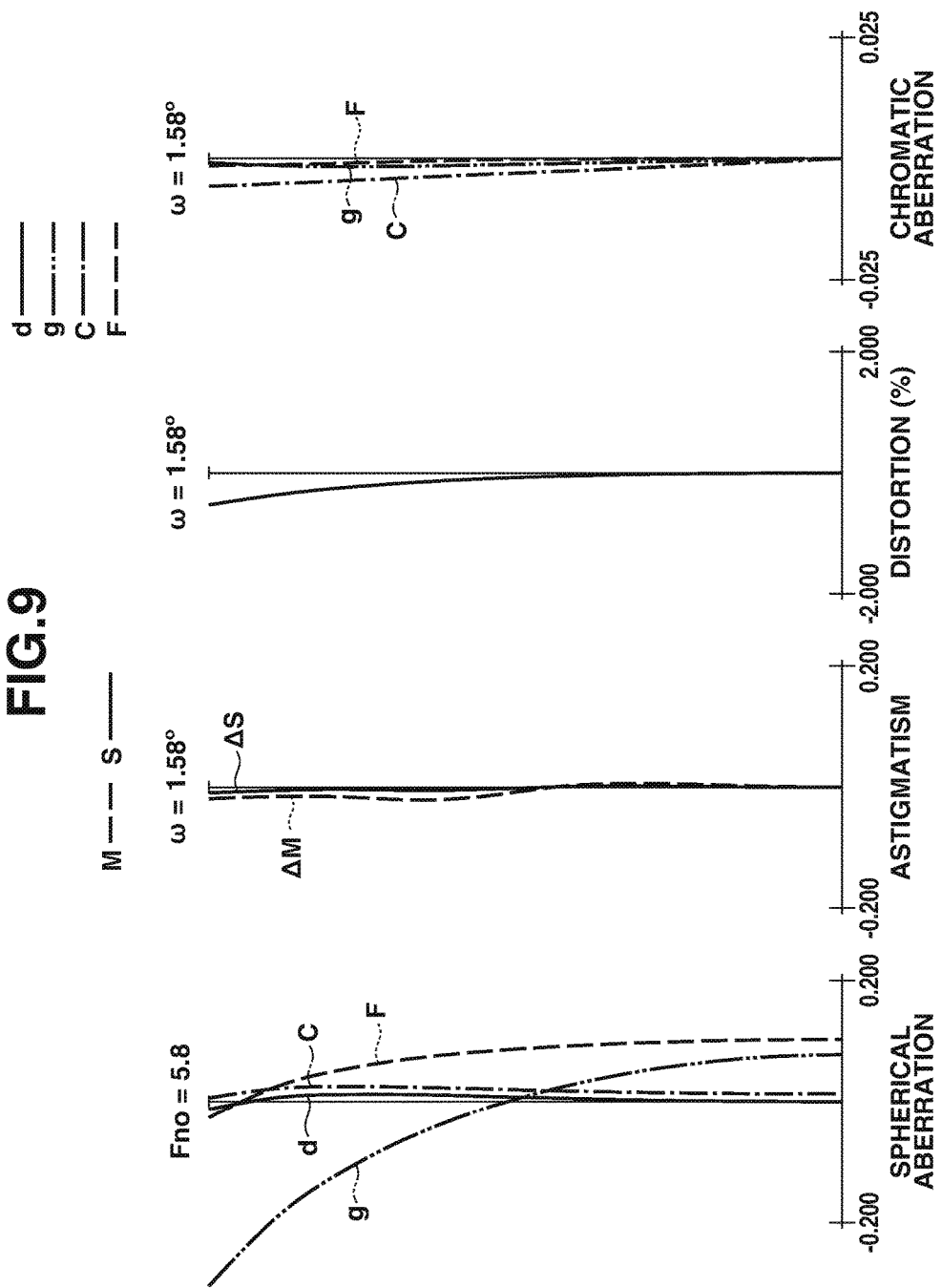
FIG. 9 is a diagram illustrating aberrations when the conversion lens of the fourth exemplary embodiment is attached to a master lens.
Figure 10:
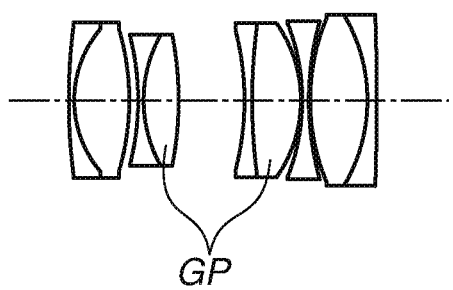
FIG. 10 is a cross-sectional diagram illustrating a conversion lens of a fifth exemplary embodiment.
Figure 11:
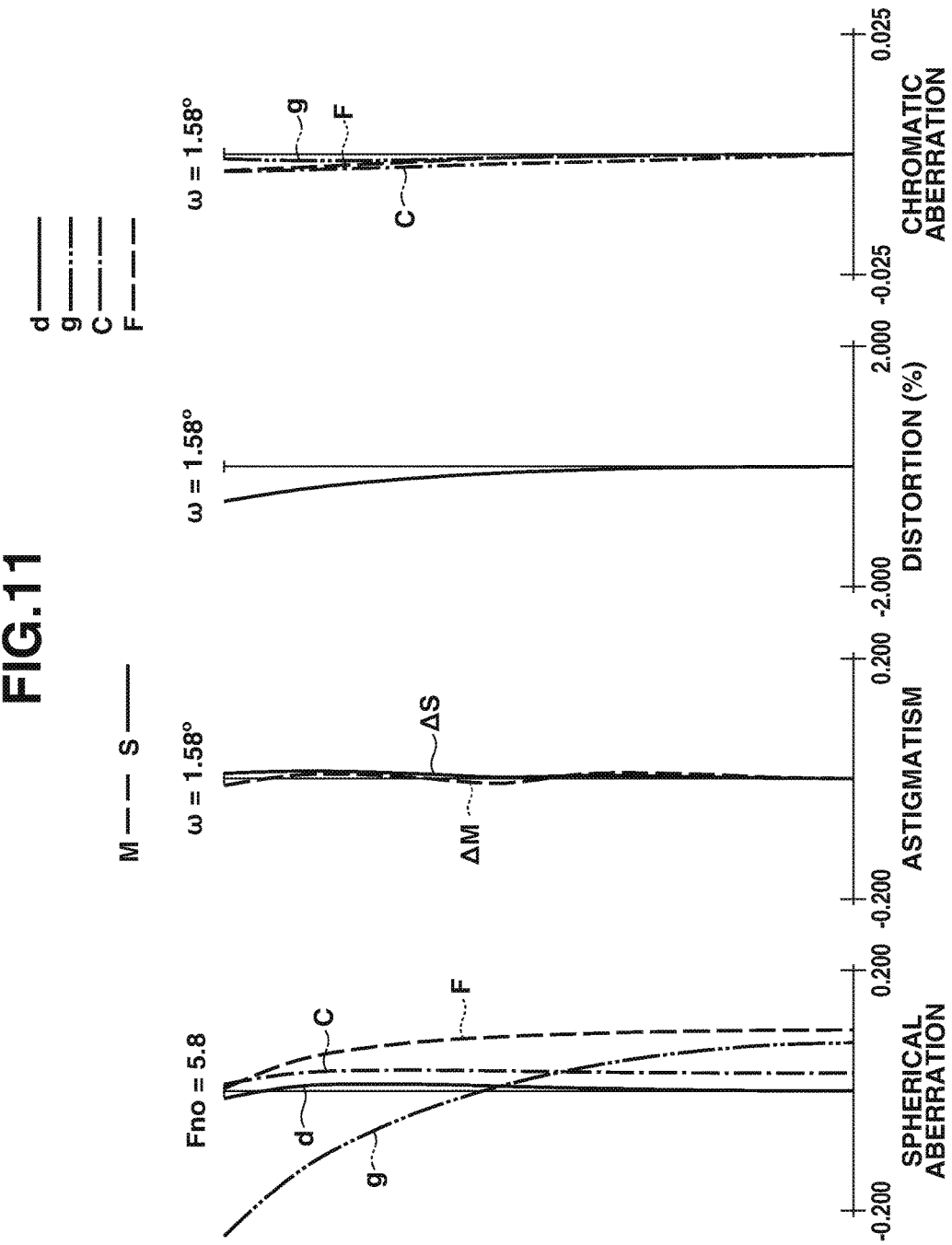
FIG. 11 is a diagram illustrating aberrations when the conversion lens of the fifth exemplary embodiment is attached to a master lens.

FIG. 1 is a cross-sectional diagram illustrating a state where a conversion lens 1 of a first exemplary embodiment described below is attached to a master lens ML. In FIG. 1, a left side of the cross-sectional diagram is regarded as an object side, whereas a right side thereof is regarded as an image side. In addition, the master lens ML refers to a lens that can be used by being directly attached to a main unit of the imaging apparatus.

As illustrated in FIG. 1, the conversion lens 1 is a rear conversion lens attached to the image side of the master lens ML. By attaching the conversion lens 1 to the image side of the master lens ML, a focal length thereof can be made longer than that of the master lens ML alone. The diagram in FIG. 1 may be an imaging optical system integrally configured of the master lens ML and the conversion lens 1 attached to the image side of the master lens ML.

Further, an aperture diaphragm SP and an image surface (image plane) IP are also illustrated in FIG. 1. When the master lens ML and the conversion lens 1 are used as an imaging optical system of a video camera or a digital camera, an image sensor such as a charge coupled device (CCD) sensor or a complementary metal oxide semiconductor (CMOS) sensor is arranged on the image surface IP. When the master lens ML and the conversion lens 1 are used as an imaging optical system of a silver-halide film camera, a film is arranged on the image surface IP. Further, a flare-cut diaphragm FP is also illustrated in FIG. 1.

FIGS. 2, 4, 6, 8, and 10 are cross-sectional diagrams illustrating various examples of the conversion lens according to the first to the fifth exemplary embodiments. Further, FIGS. 3, 5, 7, 9, and 11 are graphs illustrating aberrations when the conversion lenses of the first to the fifth exemplary embodiments are attached to the image side of the master lens ML. In each of the aberration graphs, "Fno" represents an F-number, a symbol "ω" represents a half-angle of view that is an angle of view based on paraxial calculation. In the "spherical aberration" graphs, a continuous line "d" represents a d-line (wavelength of 587.6 nm), a long dashed double-dot line "g" represents a g-line (wavelength of 435.8 nm), a long dashed single-dot line represents a C-line (wavelength of 656.3 nm), and a dashed line "F" represents an F-line (wavelength of 486.1 nm).

Further, in an "astigmatism" graphs, a continuous line ΔS represents a sagittal image surface at the d-line, and a dashed line "ΔM" represents a meridional image surface at the d-line. A "distortion" graph illustrates an amount (percentage) of distortion with respect to the d-line. In a "chromatic aberration" graph, an amount of chromatic aberration of magnification is plotted where: a long dashed double-dot line "g" represents the g-line, a long dashed single-dot line "C" represents the C-line, and a dashed line "F" represents the F-line.

In order to favorably correct the chromatic aberration of magnification and the field curvature of an image formed by the master lens combined with the conversion lens, the conversion lens of each of the exemplary embodiments includes at least one positive lens GP that satisfies all of the following conditional expressions 1 to 3.

$$30 \le vd \le 40 \quad \text{Expression 1}$$

$$1.225 \le [nd-(14.387/vd)] \le 1.276 \quad \text{Expression 2}$$

$$0.4300 \le [\theta gF-(2.9795/vd)] \le 0.5010 \quad \text{Expression 3}$$

In each of the expressions 1 and 2, "vd" is an Abbe number of the positive lens GP. In the expression 2, "nd" is a refractive index with respect to the d-line of the positive lens GP. In the expression 3, "θgF" is a partial dispersion ratio with respect to the g-line and the F-line of the positive lens GP.

When the respective refractive indexes with respect to the g-line, the F-line, the d-line, and the C-line in the Fraunhofer lines are expressed as "ng", "nF", "nd" and "nC", the Abbe number vd is defined by the following expression 4. Further, the partial dispersion ratio θgF is defined by the following expression 5.

$$vd=(nd-1)/(nF-nC) \quad \text{Expression 4}$$

$$\theta gF=(ng-nd)/(nF-nC) \quad \text{Expression 5}$$

The expressions 1 to 3 indicate that the conversion lens of each of the exemplary embodiments includes the positive lens GP formed of a highly-dispersive optical material having a low partial dispersion ratio and a low refractive index. Herein, a reason why the chromatic aberration of magnification and the field curvature can be corrected by the above-described positive lens GP will be described with reference to FIG. 12.

Figure 12:
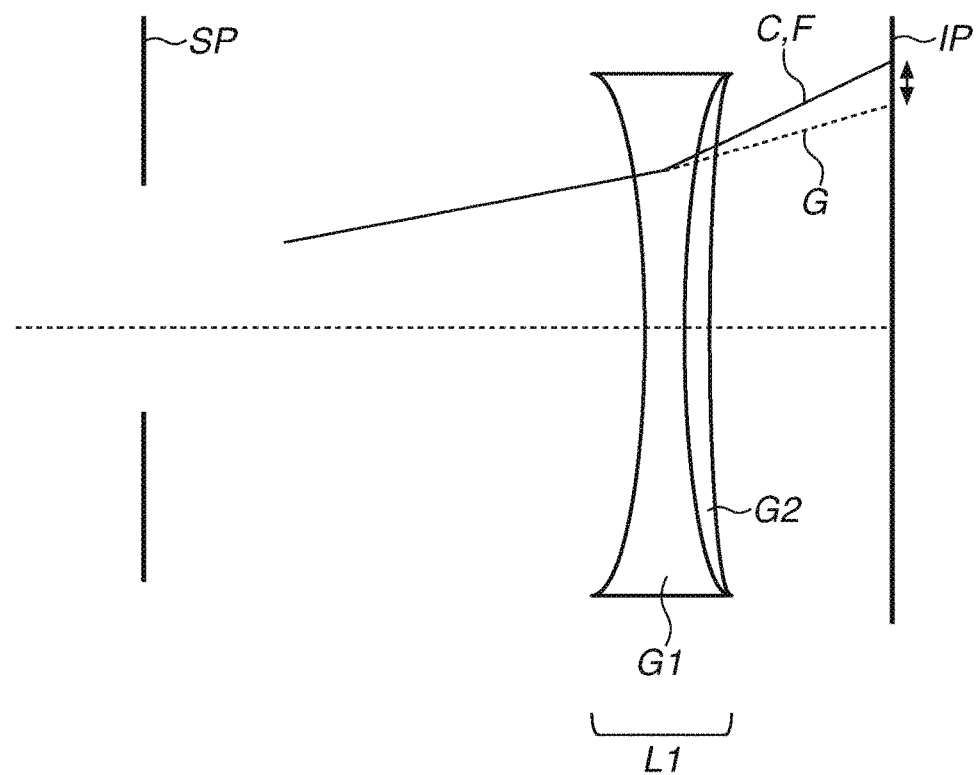
FIG. 12 is a diagram illustrating achromatization of two colors and a secondary spectrum in an optical system having a negative refractive power.

FIG. 12 is a schematic diagram illustrating achromatization of two colors (C-line and F-line) and a residual secondary spectrum in an optical system L1 having a negative refractive power. The optical system L1 is arranged on a light emitting side of the aperture diaphragm SP, and has a negative refractive power φ. Further, the optical system L1 is configured of a negative lens G1 having a refractive power φ1 and a positive lens G2 having a refractive power φ2. At this time, the refractive powers φ1 and φ2 satisfy the following relational expression 6.

$$\varphi 1+\varphi 2=\varphi \quad \text{Expression 6}$$

When the Abbe numbers of the two lenses G1 and G2 are "vd1" and "vd2", the achromatization condition of the C-line and the F-line in the closely-contact-thin-lens system configured of the two lenses G1 and G2 is expressed by the following expression 7.

$$\varphi 1/vd1+\varphi 2/vd2=0 \quad \text{Expression 7}$$

When the expression 7 is satisfied, as illustrated in FIG. 12, image-forming positions of the C-line and the F-line in the optical system L1 conform to each other. At this time, because the refractive power φ is expressed as "φ1+φ2=φ", the refractive powers φ1 and φ2 are expressed by the following expressions 8 and 9.

$$\varphi 1=\varphi \cdot vd1/(vd1-vd2) \quad \text{Expression 8}$$

$$\varphi 2=-\varphi \cdot vd2/(vd1-vd2) \quad \text{Expression 9}$$

From the expressions 8 and 9, it is found that, in the achromatization of two colors (the C-line and the F-line) in the optical system L1, the Abbe number vd1 of the negative lens G1 has to be relatively large, and the Abbe number vd2 of the positive lens G2 has to be relatively small.

Herein, in a general glass material, a partial dispersion ratio with respect to the g-line and the F-line becomes greater when the Abbe number is smaller. In other words, in FIG. 12, a partial dispersion ratio θgF1 of the negative lens G1 with respect to the g-line and the F-line becomes small, and a partial dispersion ratio θgF2 of the positive lens G2 with respect to the g-line and the F-line becomes large. Therefore, an image-forming position of the g-line is shifted from image-forming positions of the F-line and the C-line. When this shift amount is regarded as a secondary spectrum amount Δ of the chromatic aberration of magnification, the secondary spectrum amount Δ satisfies the following relational expression 10.

$$\Delta \text{ proportional to } (\theta gF1-\theta gF2)/(vd1-vd2) \quad \text{Expression 10}$$

From the expression 10, it is found that the secondary spectrum amount Δ of the chromatic aberration of magnification can be reduced if the values of the partial dispersion ratios θgF1 and θgF2 are close to each other. Accordingly, the positive lens G2 may be formed of an optical material having a smaller partial dispersion ratio. In other words, a material that exhibits negative anomalous partial dispersibility may be used as the material for forming the positive lens G2. In addition, "anomalous partial dispersibility" refers to a partial dispersion property different from that of normal glass, and "negative anomalous partial dispersibility" refers to a partial dispersion property in which partial dispersion is lower than that of normal glass at the short wavelength.

However, conventional highly-dispersive optical glass that exhibits the negative anomalous partial dispersibility tends to have a large refractive index. Further, because the conversion lens has a negative refractive power, generally, the Petzval sum of the conversion lens takes a negative value. Accordingly, in a case where the positive lens formed of the above-described known optical glass is to be used, it is difficult to correct the Petzval sum of the conversion lens.

Therefore, in the conversion lens of each of the exemplary embodiments, a highly-dispersive positive lens GP having a low partial dispersion ratio and a relatively small refractive index is used, so that the chromatic aberration of magnification and the field curvature are favorably corrected.

Subsequently, respective expressions 1 to 3 will be described.

The expression 1 relates to the Abbe number of the positive lens GP. In a case where the positive lens GP has dispersion that is so low that a value of the Abbe number vd becomes greater than the upper limit value of the conditional expression 1, it is difficult to correct primary chromatic aberration by using the positive lens GP. Further, it is undesirable/unfavorable for the positive lens GP to have dispersion that is so high that a value of the Abbe number vd becomes less than the lower limit value of the conditional expression 1 because transmissivity of the positive lens GP may be lowered or environment resistance thereof may be degraded.

In order to increase a primary achromatization effect, the expression 1 may desirably be set within a range of the following expression 1a, and more desirably, the expression 1 may be set within a range of the following expression 1b.

$31 \leq vd \leq 39.5$  Expression 1a $32 \leq vd \leq 38$  Expression 1b

The expression 2 specifies a relationship between the refractive index and the Abbe number of the positive lens GP. In a case where the refractive index of the positive lens GP is so large that a value of the expression becomes greater than the upper limit value, it is difficult to correct a negative Petzval sum of the conversion lens. As a result, it is difficult to correct the field curvature. Further, in a case where the refractive index of the positive lens GP is so small that a value of the conditional expression 2 becomes less than the lower limit value, curvature necessary for the positive lens GP to have a refractive power sufficient for correcting the chromatic aberration and the field curvature is increased, and thus it is difficult to miniaturize the conversion lens.

In order to achieve both of correction of the field curvature and miniaturization of the conversion lens, the expression 2 may desirably be set within a range of the following expression 2a, and more desirably, the expression 2 may be set within a range of the following expression 2b.

$1.235 < [nd - (14.387/vd)] < 1.273$  Expression 2a $1.245 < [nd - (14.387/vd)] < 1.270$  Expression 2b The expression 3 relates to anomalous partial dispersibility of the positive lens GP. In a case where the negative anomalous partial dispersibility of the positive lens GP is so low that a value of the expression 3 becomes greater than the upper limit value, it is difficult to sufficiently correct the secondary spectrum of on-axis chromatic aberration with the positive lens GP. Further, in a case where the negative anomalous partial dispersibility is so high that a value of the expression 3 becomes less than the lower limit value, it is difficult to manufacture a glass material that satisfies the expressions 1 and 2.

In order to reduce the primary and the secondary chromatic aberration with proper balance, the expression 3 may desirably be set within a range of the following expression 3a, and more desirably, the expression 3 may be set within a range of the expression 3b.

$0.4650 < [\theta gF - (2.9795/vd)] < 0.5005$  Expression 3a $0.4800 < [\theta gF - (2.9795/vd)] < 0.5000$  Expression 3b For example, raw materials of silicon dioxide-niobium pentoxide ($SiO_2$—$Nb_2O_5$) optical glass is melted after zirconium dioxide ($ZrO_2$) or alkali metal oxide is added thereto, so that an optical material that satisfies the expressions 1, 2, and 3 can be acquired. For example, the $SiO_2$—$Nb_2O_5$ optical glass described in Japanese Patent Application Laid-Open No. 10-265238 and optical glass containing alkali metal described in Japanese Patent Application Laid-Open No. 6-135738 may be prepared and mixed. Thereafter, the mixed material is fused, agitated, and homogenized by using a platinum crucible, molded into a block shape, and slowly cooled, so that the optical glass that satisfies the expressions 1, 2, and 3 can be acquired.

Further, optical glass (nd=1.63980, vd=34.5, $\theta gF$=0.5922) under the product name S-TIM27 manufactured by Ohara Inc. and optical glass (nd=1.69072, vd=36.2, $\theta gF$=0.5775) of a sixth exemplary embodiment described in Japanese Patent Application Laid-Open No. 10-265238 may be mixed at a ratio of 2:3. In this case, the glass material (nd=1.67035, vd=35.5, $\theta gF$=0.5834) that satisfies the conditional expressions 1, 2, and 3 can be also acquired.

Further, the positive lens GP may desirably be formed of a glass material. This is because the manufacture of a glass material is easier than that of an organic material such as a resinous material. Further, a thickness is less restricted in the molding of a glass material than in the molding of a resinous material. Therefore, if the positive lens GP is formed of a glass material, a degree of freedom in designing the refractive power of the positive lens GP can be increased. Further, the glass material has excellent environment resistance to change of humidity or temperature and sufficient hardness.

Further, it is desirable for the conversion lens of each of the exemplary embodiments to satisfy one or more conditional expressions from the following conditional expressions 11 to 15.

$0.15 < fA/|f| < 0.70$  Expression 11

$-0.6 < HR/TD < -0.05$  Expression 12

$-1.0 < (rpa+rpb)/(rpa-rpb) < 1.0$  Expression 13

$1.48 < nP < 1.75$  Expression 14

$0.8 < nP/nN < 1.0$  Expression 15

In the expression 11, "f" is a focal length of the entire conversion lens system, and "fA" is a focal length of the positive lens GP when both of refracting surfaces on a light-incident side and a light-emitting side of the positive lens GP are exposed to air.

In the expression 12, "HR" represents a rear principal point position. Herein, the rear principal point position refers to a distance between the refracting surface positioned closest to the image side of the conversion lens and the rear principal point. The rear principal point position HR takes a negative value when the rear principal point is positioned closer to the object side than the refracting surface positioned closest to the image side of the conversion lens. Further, "TD" represents a distance between the refracting surface positioned closest to the object side of the conversion lens and the refracting surface thereof positioned closest to the image side, on an optical axis.

In the expression 13, "rpa" is a curvature radius of the refracting surface on the object side of the positive lens GP. Further, "rpb" is a curvature radius of the refracting surface on the image side of the positive lens GP.

In the expression 14 and 15, "nP" is an average value of refractive indexes of all of the positive lenses with respect to the d-line in the conversion lens.

In the expression 15, "nN" is an average value of refractive indexes of all of the negative lenses with respect to the d-line in the conversion lens.

The expressions 11 to 15 will be described.

The expression 11 specifies a relationship between the focal length of the positive lens GP and the focal length of the entire conversion lens. In a case where the positive lens GP has a refractive power that is so low that the focal length of the positive lens GP becomes greater than the upper limit value of the expression 11, it is difficult to sufficiently correct primary chromatic aberration. Further, it is undesirable for the positive lens GP to have a refractive power that is so high that the focal length of the positive lens GP becomes less than the lower limit value of the expression 11 because field curvature of color arises although it is advantageous to correct the primary chromatic aberration.

The expression 11 may desirably be set within a range of the following expression 11a, and more desirably, the expression 11 may be set within a range of the expression 11b.

$$0.22 < fA/|f| < 0.62 \quad \text{Expression 11a}$$

$$0.27 < fA/|f| < 0.58 \quad \text{Expression 11b}$$

The expression 12 specifies a rear principal point position with respect to an entire length of the conversion lens. It is possible to planarize an image surface more favorably by providing the positive lens GP to the conversion lens that satisfies the expression 12. When the rear principal point approaches the image surface so close that a value of the expression 12 becomes greater than the upper limit value, it is difficult to correct the field curvature because an on-axis light flux and an off-axis light flux are hardly separated. It is undesirable for a value of the expression 12 to be less than the lower limit value because the refractive power of each of the lenses constituting the conversion lens is increased, and thus aberration arising in each of the surfaces of the lenses constituting the conversion lens is increased.

The expression 12 may desirably be set within a range of the following expression 12a, and more desirably, the expression 12 may be set within a range of the expression 12b.

$$-0.50 < HR/TD < -0.10 \quad \text{Expression 12a}$$

$$-0.47 < HR/TD < -0.12 \quad \text{Expression 12b}$$

The expression 13 relates to a shape factor of the positive lens GP. When a value of the expression 13 becomes greater than the upper limit value, it is difficult to sufficiently correct various aberrations such as the chromatic aberration of magnification. Particularly, it is difficult to favorably correct the secondary spectrum of the chromatic aberration of magnification. It is undesirable for a value of the expression 13 to be less than the lower limit value because field curvature of color is likely to occur.

Further, an increase in the absolute value of the shape factor indicates that a difference between the curvature radiuses rpa and rpb is reduced. In this case, both of the curvature radiuses rpa and rpb have to be reduced in order to make the positive lens GP have a refractive power sufficient for correcting the chromatic aberration and the field curvature, and thus it is difficult to miniaturize the conversion lens. Accordingly, it is desirable that an absolute value of the shape factor of the positive lens GP be small to a certain extent. Therefore, the expression 13 may desirably be set within a range of the following expression 13a, and more desirably, the expression 13 may be set within a range of the expression 13b.

$$-0.85 < (rpa+rpb)/(rpa-rpb) < 0.85 \quad \text{Expression 13a}$$

$$-0.70 < (rpa+rpb)/(rpa-rpb) < 0.75 \quad \text{Expression 13b}$$

The expression 14 relates to an average value of refractive indexes of the positive lenses of the conversion lens. As described above, the positive lens GP has a comparatively small refractive index. Herein, in order to further reduce the field curvature, it is also desirable for the positive lenses other than the positive lens GP constituting the conversion lens to have comparatively small refractive indexes.

Therefore, by satisfying the expression 14, it is possible to miniaturize the conversion lens while sufficiently reducing the field curvature. When a value of the expression 14 is greater than the upper limit value, the refractive index of the positive lens in the conversion lens becomes too large in its entirety, so that it is difficult to correct a negative Petzval sum, and thus the field curvature is hardly reduced.

Further, when a value of the expression 14 is less than the lower limit value, the refractive index of the positive lens in the conversion lens becomes too small in its entirety, so that the curvature that is necessary to acquire the refractive power necessary to sufficiently reduce the primary on-axis chromatic aberration becomes too sharp. Such a situation is not desirable because a size of the conversion lens is increased.

The expression 14 may desirably be set within a range of the following expression 14a, and more desirably, the expression 14 may be set within a range of the expression 14b.

$$1.52 < nP < 1.72 \quad \text{Expression 14a}$$

$$1.55 < nP < 1.67 \quad \text{Expression 14b}$$

The expression 15 relates to a ratio between the average value of refractive indexes of the positive lenses and the average value of refractive indexes of the negative lenses in the conversion lens. By providing the positive lens GP to the conversion lens that satisfies the expression 15, field curvature and on-axis chromatic aberration can be further reduced.

In the conversion lens having a negative refractive power in its entirety, a large refractive index of the negative lens is advantageous to sufficiently reduce the field curvature. In a case where the average value nN is so small that a value of the expression 15 becomes greater than the upper limit value, it is difficult to correct a negative Petzval sum of the conversion lens. In this case, the field curvature is hardly reduced, and the conversion lens is increased in size if the field curvature is sufficiently reduced. Further, in a case where the average value nN is so large that a value of the expression becomes less than the lower limit value, chromatic aberration is hardly corrected because the Abbe number of the negative lens becomes too small, although it is advantageous to correct the field curvature.

The expression 15 may desirably be set within a range of the following expression 15a, and more desirably, the expression 15 may be set within a range of the expression 15b.

$$0.85 < nP/nN < 0.95 \quad \text{Expression 15a}$$

$$0.87 < nP/nN < 0.93 \quad \text{Expression 15b}$$

In addition, the conversion lens of the present invention may include a plurality of positive lenses GP that satisfies the expressions 1 to 3.

Further, although a rear conversion lens attached to the end portion on the image side of the master lens ML is illustrated in FIG. 1, the conversion lens according to the present invention is not limited thereto. The conversion lens of the present invention may be provided inside a mount adapter used for mounting a same lens on imaging apparatuses having different flange backs. By providing the conversion lens inside the mount adapter, extension of both of the flange back and the focal length can be simultaneously achieved.

Further, the conversion lens of the present invention may be built into an interchangeable lens (lens device). In other words, a space for removing the conversion lens from the optical axis is provided, so that the conversion lens can be inserted to or removed from the optical axis. If the conversion lens capable of being inserted to or removed from the optical axis is built into the interchangeable lens, a focal length can be changed easily because the conversion lens does not have to be attached or detached.

Next, the first to the fifth exemplary embodiments will be described.

In the conversion lens 1 of the first exemplary embodiment, the sixth lens is the positive lens GP. In the conversion lens 2 of the second exemplary embodiment, the sixth lens is the positive lens GP. In the conversion lens of the third exemplary embodiment, the second and the sixth lenses are the positive lenses GP. In the conversion lens 4 of the fourth exemplary embodiment, the fourth and the sixth lenses are the positive lenses GP. In the conversion lens 5 of the fifth exemplary embodiment, the fourth and the sixth lenses are the positive lenses GP.

As described above, the conversion lens of each of the exemplary embodiments includes at least one positive lens GP that satisfies the expressions 1 to 3, so that chromatic aberration and field curvature are favorably corrected.

Hereinafter, numerical embodiments corresponding to the master lens ML and the conversion lenses of the first to the fifth exemplary embodiments will be described. The cross-sectional view of the master lens ML is illustrated in FIG. 1. Further, the numerical embodiments 1 to 5 correspond to the conversion lenses of the first to the fifth exemplary embodiments.

In the surface data of each of the numerical embodiments, "r" represents a curvature radius of each optical surface, and "d(mm)" represents an on-axis space (distance on an optical axis) between the m-th surface and the m+1-th surface. Herein, "m" is a surface number counted from a surface on a light incident side. Further, "nd" represents a refractive index with respect to a d-line of an optical member, "vd" represents an Abbe number of an optical member with respect to a d-line, and "θgF" represents a partial dispersion ratio of an optical member with respect to a g-line and an F-line.

Further, in each of the numerical embodiments, "d", a focal length (mm), an F-number, and a half-angle of view (°) represent values when a parallel light beam is incident on the conversion lens of each of the exemplary embodiments. A back-focus BF is a distance from a last lens surface to an image surface. Further, an entire lens length in the numerical embodiment of the master lens ML is a sum of a distance from the first to the last lens surfaces and a value of the back-focus BF. The entire lens length in each of the numerical embodiments 1 to 5 corresponding to the first to the fifth exemplary embodiments is a distance from the first lens surface to the last lens surface.

<Master Lens>

| Unit (mm) | | | | | |
|---|---|---|---|---|---|
| Surface Data | | | | | |
| Surface Number | r | d | nd | vd | θgF |
| 1 | 292.465 | 15.81 | 1.48749 | 70.45 | 0.5303 |
| 2 | −517.524 | 29.13 | | | |
| 3 | 145.749 | 21.85 | 1.43387 | 95.10 | 0.5373 |
| 4 | −310.360 | 0.08 | | | |
| 5 | −309.759 | 4.30 | 1.65412 | 39.68 | 0.5737 |
| 6 | 260.211 | 26.17 | | | |
| 7 | 90.793 | 15.28 | 1.43387 | 95.10 | 0.5373 |
| 8 | 529.656 | 0.25 | | | |
| 9 | 67.742 | 6.00 | 1.48749 | 70.23 | 0.5300 |
| 10 | 52.993 | 29.99 | | | |
| 11 | 807.025 | 6.60 | 1.80810 | 22.76 | 0.6307 |
| 12 | −149.923 | 3.20 | 1.83400 | 37.16 | 0.5776 |
| 13 | 132.030 | 81.82 | | | |
| 14 (Aperture) | ∞ | 3.43 | | | |
| 15 | 365.029 | 6.38 | 1.65160 | 58.55 | 0.5425 |
| 16 | −64.603 | 2.18 | 1.84666 | 23.78 | 0.6191 |
| 17 | −140.611 | 4.43 | | | |
| 18 | 88.023 | 4.87 | 1.84666 | 23.78 | 0.6191 |
| 19 | −141.829 | 1.70 | 1.69680 | 55.53 | 0.5434 |
| 20 | 40.372 | 5.33 | | | |
| 21 | −141.777 | 1.70 | 1.83481 | 42.71 | 0.5642 |
| 22 | 95.226 | 3.39 | | | |
| 23 | 99.547 | 5.56 | 1.80400 | 46.57 | 0.5572 |
| 24 | −250.416 | 10.03 | | | |
| 25 | 59.528 | 7.72 | 1.74951 | 35.33 | 0.5818 |
| 26 | −105.426 | 2.00 | 1.80810 | 22.76 | 0.6307 |
| 27 | 107.015 | 4.26 | | | |
| 28 | ∞ | 2.20 | 1.51633 | 64.14 | 0.5353 |
| 29 | ∞ | 22.09 | | | |
| 30 (FP) | ∞ | 44.00 | | | |
| Image Surface | ∞ | | | | |

| Various Data | |
|---|---|
| Focal Length | 392.18 |
| F-Number | 2.90 |
| Half Angle of View (°) | 3.16 |
| Image Height | 21.64 |
| Entire Lens Length | 371.76 |
| BF | 44.00 |

Numerical Embodiment 1

| Unit (mm) | | | | | |
|---|---|---|---|---|---|
| Surface Data | | | | | |
| Surface Number | r | d | nd | vd | θgF |
| 1 | 177.640 | 1.35 | 1.88300 | 40.76 | 0.5667 |
| 2 | 46.738 | 5.56 | 1.59270 | 35.31 | 0.5933 |
| 3 | −69.004 | 3.67 | | | |
| 4 | −84.346 | 1.45 | 1.72916 | 54.68 | 0.5444 |
| 5 | 35.851 | 8.45 | 1.61340 | 44.27 | 0.5633 |
| 6 | −34.540 | 1.80 | 1.81600 | 46.62 | 0.5568 |
| 7 | 134.317 | 0.44 | | | |
| 8 | 52.879 | 7.08 | 1.62606 | 39.09 | 0.5762 |
| 9 | −170.746 | 1.60 | 1.89286 | 20.36 | 0.6393 |
| 10 | 297.753 | | | | |

| Various Data | |
|---|---|
| Focal Length | −112.81 |
| Magnification | 1.40 |
| Entire Lens Length | 31.40 |
| Front Principal Point Position | 16.69 |
| Rear Principal Point Position | −4.10 |

Numerical Embodiment 2

Unit (mm)

Surface Data

| Surface Number | r | d | nd | vd | θgF |
|---|---|---|---|---|---|
| 1 | 209.265 | 1.35 | 1.88300 | 40.76 | 0.5667 |
| 2 | 44.272 | 5.67 | 1.59270 | 35.31 | 0.5933 |
| 3 | −71.835 | 4.54 | | | |
| 4 | −89.518 | 1.45 | 1.74100 | 52.64 | 0.5467 |
| 5 | 41.920 | 7.93 | 1.61340 | 44.27 | 0.5633 |
| 6 | −34.914 | 1.80 | 1.81600 | 46.62 | 0.5568 |
| 7 | 140.730 | 0.61 | | | |
| 8 | 55.318 | 5.83 | 1.72439 | 32.05 | 0.5867 |
| 9 | −258.601 | 1.60 | 1.95906 | 17.47 | 0.6598 |
| 10 | 231.783 | | | | |

Various Data

| | |
|---|---|
| Focal Length | −115.76 |
| Magnification | 1.40 |
| Entire Lens Length | 30.79 |
| Front Principal Point Position | 15.68 |
| Rear Principal Point Position | −4.75 |

Numerical Embodiment 3

Unit (mm)

Surface Data

| Surface Number | r | d | nd | vd | θgF |
|---|---|---|---|---|---|
| 1 | 482.904 | 1.35 | 1.85150 | 40.78 | 0.5695 |
| 2 | 38.273 | 5.92 | 1.66565 | 35.64 | 0.5824 |
| 3 | −69.295 | 3.20 | | | |
| 4 | −102.349 | 1.45 | 1.74100 | 52.64 | 0.5467 |
| 5 | 29.739 | 8.27 | 1.61340 | 44.27 | 0.5633 |
| 6 | −37.020 | 2.07 | 1.81600 | 46.62 | 0.5568 |
| 7 | 115.814 | 0.34 | | | |
| 8 | 47.074 | 7.53 | 1.70771 | 31.16 | 0.5958 |
| 9 | −43.685 | 1.60 | 1.80810 | 22.76 | 0.6307 |
| 10 | 216.777 | | | | |

Various Data

| | |
|---|---|
| Focal Length | −119.94 |
| Magnification | 1.40 |
| Entire Lens Length | 31.73 |
| Front Principal Point Position | 15.66 |
| Rear Principal Point Position | −5.30 |

Numerical Embodiment 4

Unit (mm)

Surface Data

| Surface Number | r | d | nd | vd | θgF |
|---|---|---|---|---|---|
| 1 | 105.676 | 1.00 | 1.81600 | 46.62 | 0.5568 |
| 2 | 19.338 | 10.47 | 1.57501 | 41.50 | 0.5767 |
| 3 | −44.883 | 1.82 | | | |
| 4 | −41.944 | 1.00 | 1.75500 | 52.32 | 0.5475 |
| 5 | 31.901 | 5.93 | 1.62606 | 39.09 | 0.5762 |
| 6 | −48.054 | 9.81 | | | |
| 7 | −42.612 | 1.40 | 2.00069 | 25.46 | 0.6133 |
| 8 | 147.729 | 9.19 | 1.63980 | 36.20 | 0.5778 |
| 9 | −23.907 | 0.25 | | | |
| 10 | −39.269 | 1.20 | 1.59282 | 68.63 | 0.5446 |
| 11 | 53.292 | 0.25 | | | |
| 12 | 38.605 | 11.66 | 1.48749 | 70.23 | 0.5300 |
| 13 | −27.088 | 1.70 | 1.59282 | 68.63 | 0.5446 |
| 14 | −325.325 | | | | |

Various Data

| | |
|---|---|
| Focal Length | −71.69 |
| Magnification | 1.75 |
| Entire Lens Length | 55.68 |
| Front Principal Point Position | 13.17 |
| Rear Principal Point Position | −25.82 |

Numerical Embodiment 5

Unit (mm)

Surface Data

| Surface Number | r | d | nd | vd | θgF |
|---|---|---|---|---|---|
| 1 | 106.109 | 1.00 | 1.81600 | 46.62 | 0.5568 |
| 2 | 20.128 | 10.04 | 1.54814 | 45.79 | 0.5686 |
| 3 | −45.667 | 1.62 | | | |
| 4 | −47.041 | 1.00 | 1.75500 | 52.32 | 0.5475 |
| 5 | 24.452 | 6.39 | 1.66565 | 35.64 | 0.5824 |
| 6 | −61.410 | 12.01 | | | |
| 7 | −50.454 | 1.40 | 2.00069 | 25.46 | 0.6133 |
| 8 | 104.651 | 8.89 | 1.65460 | 37.95 | 0.5675 |
| 9 | −24.422 | 0.25 | | | |
| 10 | −38.120 | 1.20 | 1.59282 | 68.63 | 0.5446 |
| 11 | 53.263 | 0.25 | | | |
| 12 | 38.981 | 10.44 | 1.48749 | 70.23 | 0.5300 |
| 13 | −30.520 | 1.70 | 1.59282 | 68.63 | 0.5446 |
| 14 | −455.010 | variable | | | |
| Image Surface | ∞ | | | | |

Various Data

| | |
|---|---|
| Focal Length | −71.77 |
| Magnification | 2.00 |
| Entire Lens Length | 56.20 |
| Front Principal Point Position | 13.13 |
| Rear Principal Point Position | −26.40 |

Various numerical values in respective numerical embodiments are collectively described in Table 1.

TABLE 1

|  | 1st Exemplary Embodiment | 2nd Exemplary Embodiment | 3rd Exemplary Embodiment | | 4th Exemplary Embodiment | | 5th Exemplary Embodiment | |
|---|---|---|---|---|---|---|---|---|
| f | −112.806 | −116.381 | −119.937 | | −71.691 | | −71.361 | |
| Lens No. | 6 | 6 | 2 | 6 | 4 | 6 | 4 | 6 |
| (1) vd | 39.09 | 32.05 | 35.64 | 31.16 | 39.09 | 36.20 | 35.64 | 37.95 |
| nd | 1.62606 | 1.72439 | 1.66565 | 1.70771 | 1.62606 | 1.63980 | 1.66565 | 1.65400 |
| (2) nd − 14.387/vd | 1.2580 | 1.2755 | 1.2620 | 1.2460 | 1.2580 | 1.2424 | 1.2620 | 1.2749 |
| θgF | 0.5762 | 0.5867 | 0.5824 | 0.5958 | 0.6762 | 0.5778 | 0.5824 | 0.5675 |
| (3) θgF − 2.9795/vd | 0.5000 | 0.4937 | 0.4988 | 0.5002 | 0.5000 | 0.4955 | 0.4988 | 0.4890 |
| fA | 65.286 | 63.403 | 37.872 | 33.157 | 31.525 | 32.849 | 27.079 | 31.097 |
| (11) \|fA\|/f | 0.579 | 0.562 | 0.316 | 0.276 | 0.440 | 0.458 | 0.379 | 0.436 |
| HR | −4.102 | −4.747 | −5.302 | | −25.819 | | −26.402 | |
| TD | 31.402 | 30.786 | 31.728 | | 55.683 | | 56.198 | |
| (12) HR/TD | −0.131 | −0.154 | −0.167 | | −0.464 | | −0.470 | |
| rpa | 52.879 | 55.318 | 38.273 | 47.074 | 31.901 | 147.729 | 24.452 | 104.651 |
| rpb | −170.746 | −258.601 | −69.295 | −43.685 | −48.054 | −23.907 | −61.410 | −24.422 |
| (13) (rpa + rpb)/(rpa − rpb) | −0.527 | −0.548 | −0.288 | 0.037 | −0.202 | 0.721 | −0.430 | 0.622 |
| nN | 1.83025 | 1.84978 | 1.80415 | | 1.75147 | | 1.75147 | |
| (14) nP | 1.61072 | 1.64350 | 1.66225 | | 1.58209 | | 1.58897 | |
| (15) nP/nN | 0.880 | 0.888 | 0.921 | | 0.903 | | 0.907 | |

<Optical Apparatus>

Figure 13:
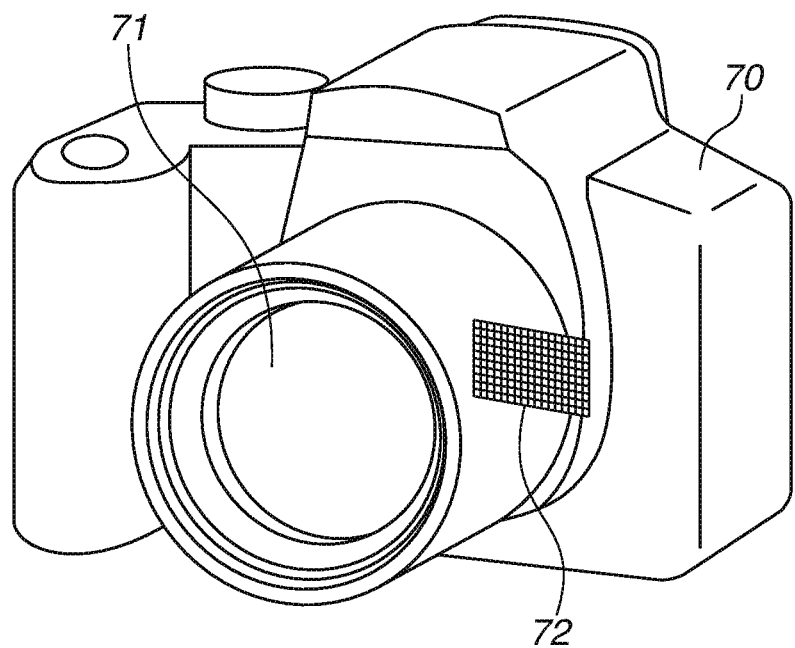
FIG. 13 is a schematic diagram of an imaging apparatus.

FIG. 13 is a schematic diagram illustrating an imaging apparatus (digital still camera) 100 as an optical apparatus as one exemplary embodiment of the present invention. The imaging apparatus 100 of the present exemplary embodiment includes a camera main unit 70, an imaging optical system 71 including a conversion lens similar to any one of the conversion lenses described in the first to the fifth exemplary embodiments, and a light-receiving element (image sensor) 72 that photoelectrically converts an image formed by the imaging optical system 71.

Because the imaging apparatus 100 in the present exemplary embodiment includes the imaging optical system 71 that includes the conversion lens similar to that of any one of the first to the fifth exemplary embodiments, it is possible to acquire a high-quality image in which chromatic aberration of magnification and field curvature are favorably corrected. Further, an image sensor such as a CCD sensor or a CMOS sensor can be used as the light-receiving element 72.

Furthermore, the conversion lenses of the above-described exemplary embodiments can be used not only for the digital still camera illustrated in FIG. 13, but also for various optical apparatuses such as a silver-halide film camera, a video camera, and a telescope.

Although preferred embodiments and exemplary embodiments according to the present invention have been described as the above, the present invention is not limited thereto, and various combinations, variations, and modifications are possible within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-193122, filed Sep. 30, 2016, which is hereby incorporated by reference herein in its entirety.

What is claimed is:

1. A conversion lens having a negative refractive power in its entirety, comprising:
   a positive lens,
   wherein the following conditional expressions are satisfied:

$$30 \leq vd \leq 40;$$

$$1.225 \leq [nd-(14.387/vd)] \leq 1.276; \text{ and}$$

$$0.4300 \leq [\theta gF-(2.9795/vd)] \leq 0.5010,$$

where vd is an Abbe number of the positive lens, θgF is a partial dispersion ratio of the positive lens for g-line and F-line, and nd is a refractive index of the positive lens for d-line.

2. The conversion lens according to claim 1, wherein the following conditional expression is satisfied:

$$0.15 < fA/|f| < 0.7$$

where f is a focal length of the conversion lens, and fA is a focal length of the positive lens.

3. The conversion lens according to claim 1, wherein the following conditional expression is satisfied:

$$-0.6 < HR/TD < -0.05$$

where HR is a rear principal point position of the conversion lens, and TD is a distance between a refracting surface positioned closest to an object side of the conversion lens and a refracting surface positioned closest to an image side of the conversion lens.

4. The conversion lens according to claim 1, wherein the following conditional expression is further satisfied:

$$-1.0 < (rpa+rpb)/(rpa-rpb) < 1.0$$

where rpa is a curvature radius of a refracting surface of the positive lens on an object side and rpb is a curvature radius of a refracting surface of the positive lens on an image side.

5. The conversion lens according to claim 1, further comprising:

one or more positive lenses containing the positive lens,
wherein following conditional expression is further satisfied:

$$1.48 < nP < 1.75$$

where nP is an average value of refractive indices of all positive lenses included in the conversion lens.

6. The conversion lens according to claim 1, further comprising:
   one or more positive lenses containing the positive lens, and
   one or more negative lenses,
   wherein following conditional expression is satisfied:

$$0.8 < nP/nN < 1.0$$

where nN is an average value of refractive indices of all of negative lenses included in the conversion lens, and nP is an average value of refractive indices of all positive lenses included in the conversion lens.

7. The conversion lens according to claim 1, wherein the positive lens is formed of a glass material.

8. An imaging optical system comprising:
   a master lens; and
   the conversion lens according to claim 1,
   wherein the conversion lens is attached to the master lens on an image side of the master lens.

9. An optical apparatus comprising:
   the imaging optical system according to claim 8; and
   an image sensor that receives light of an image formed by the imaging optical system.

10. A lens device comprising:
    an imaging optical system; and
    the conversion lens according to claim 1,
    wherein the conversion lens is configured to be inserted to or removed from an optical axis of the imaging optical system.

11. An optical apparatus comprising:
    the lens device according to claim 10; and
    an image sensor that receives light of an image formed by the imaging optical system.

* * * * *